United States Patent [19]
Huong

[11] Patent Number: 5,632,066
[45] Date of Patent: May 27, 1997

[54] PIVOT HINGE FOR PORTABLE COMPUTERS

[75] Inventor: Chin-Fu Huong, Taipei Hsien, Taiwan

[73] Assignee: Yen Yang Basestrong Co. Ltd, Taipei Hsien, Taiwan

[21] Appl. No.: 600,527

[22] Filed: Feb. 13, 1996

[51] Int. Cl.⁶ ..................... E05C 17/64; E05D 11/08
[52] U.S. Cl. .................. 16/338; 16/342; 403/71; 403/68; 361/807
[58] Field of Search ................ 16/338, 339, 340, 16/337, 374, 342, 252, 273, 274, 319; 403/71, 70, 68; 361/807, 679-686

[56] References Cited

U.S. PATENT DOCUMENTS

| | | | |
|---|---|---|---|
| 1,033,582 | 7/1912 | Harris | 16/338 |
| 1,638,065 | 8/1927 | Simon | 16/338 |
| 2,602,957 | 7/1952 | Anderson | 16/338 |
| 5,043,846 | 8/1991 | Kinoshita | 16/308 |
| 5,052,078 | 10/1991 | Hosoi | 16/308 |
| 5,239,731 | 8/1993 | Lu | 16/340 |

FOREIGN PATENT DOCUMENTS 0445559  9/1991  European Pat. Off. ............... 16/319

*Primary Examiner*—Chuck Y. Mah
*Attorney, Agent, or Firm*—Bacon & Thomas

[57] ABSTRACT

A pivot hinge includes a female connecting member fastened to the mainframe unit of a notebook and having two parallel flat wall portions and axle housing portions connected between the parallel flat wall portions, a male connecting member fastened to the top cover and display unit of the notebook computer and having a cylindrical pivot rod section inserted through the axle housing portions and a neck at the front end of the cylindrical pivot rod section, a plurality of fastening elements fastened to the parallel flat wall portions of the female connecting member for adjusting the friction resistance between the cylindrical pivot rod section of the male connecting member and the axle housing portions of the female connecting member, and a clamp fastened to the neck of the male connecting member to holds the male connecting member and the female connecting member together.

8 Claims, 3 Drawing Sheets

PIVOT HINGE FOR PORTABLE COMPUTERS

BACKGROUND OF THE INVENTION

The present invention relates to pivot hinges, and relates more particularly to a pivot hinge connected between the top cover and display unit of a notebook computer and the mainframe unit thereof, permitting the top cover and display unit to be turned relative to the mainframe unit and positioned at any of a variety of angles.

A regular notebook computer is generally comprised of a mainframe unit, and a top cover and display unit pivotably connected to the mainframe unit by pivot hinges. A good pivot hinge for this purpose must be durable in use and produce little noise when turned, furthermore it must be able to be positioned at any of a variety of angles. Regular pivot hinges for notebook computers commonly use two stop members acted against each other to stop the hinge at any of a variety of angles. However, when the notebook computer is opened, the stop members may pass over each other, thereby rendering the notebook computer incapable of being positioned at the desired angle. Furthermore, when the notebook computer is closed, the stop members are forced to hit against each other, thereby causing a loud noise to be produced. The application of grease to the stop members may eliminate this problem. However, the stop members will still wear quickly with use.

SUMMARY OF THE INVENTION

The present invention provides a pivot hinge which eliminates the aforesaid drawbacks. According to one aspect of the present invention, the pivot hinge comprises a female connecting member fastened to the first part of the portable computer, the female connecting member comprising a flat mounting base portion, a flat locating strip portion spaced from the flat mounting base portion in a parallel relation by a gap, at least one hollow cylindrical axle housing portion connected between the flat locating strip portion and the flat mounting base portion, a row of first through holes at the flat locating strip portion, a row of second through holes at the flat mounting base portion, a row of third through hole portions at the flat mounting base portion respectively fastened to the second part of the portable computer by fastening elements, and a plurality of fastening elements respectively connected between the first through holes and the second through holes to hold the flat locating strip portion and the flat mounting base portion closely together and turned to adjust the gap between the flat locating strip portion and the flat mounting base portion; a male connecting member fastened to a second part of the portable computer, the male connecting member comprising a flat mounting section at one end, a plurality of axle holes at the flat mounting section respectively fastened to the second part of the portable computer, a neck at an opposite end, a cylindrical pivot rod section longitudinally connected between the neck and the flat mounting section and inserted through the at least one axle housing portion of the female connecting member, a collar connected between the flat mounting section and the cylindrical pivot rod section and stopped outside the at least one axle housing portion of the female connecting member; and an end member fastened to the neck of the male connecting member to hold the male connecting member and the female connecting member together. According to another aspect of the present invention, the pivot hinge further comprises a springing and positioning mechanism, the springing and positioning mechanism comprising a flat coupling portion on the male connecting member between the neck and the cylindrical pivot rod section, a springy stop rod portion extending from the flat mounting base portion of the female connecting member, and a locating plate coupled to the flat coupling portion and turned with the male connecting member relative to the at least one axle housing portion of the female connecting member, the locating plate having a first projecting portion which engages against the springy stop rod portion to flex same when the two parts of the portable computer are closed, and a second projecting portion which engages against the stop rod portion when the two parts of the portable computer are opened.

DETAILED DESCRIPTION OF THE PREFERRED EMBODIMENT

Figure 1:
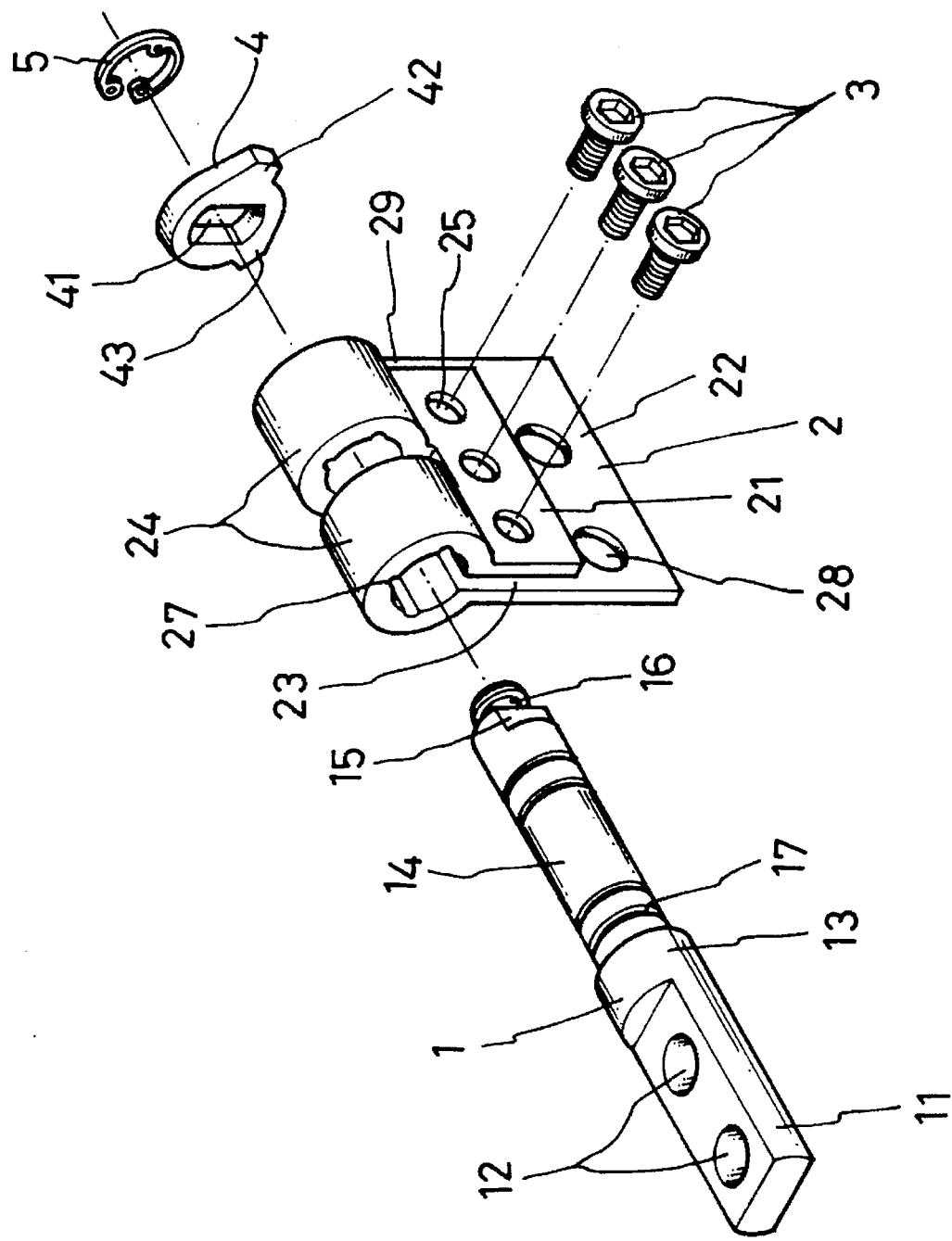
FIG. 1 is an exploded view of a pivot hinge according to the present invention.

Referring to the annexed drawings in detail, a pivot hinge in accordance with the present invention is generally comprised of a male connecting member 1, a female connecting member 2, a plurality of fastening elements 3, a locating plate 4, and a clamp 5.

Referring to FIG. 1, the male connecting member 1 comprises a flat mounting section 11 at one end, a plurality of axle holes 12 at the flat mounting section 11 for fastening to the top cover and display unit of the notebook computer or the mainframe unit thereof, a neck 16 at an opposite end for mounting the clamp 5, a cylindrical pivot rod section 14 longitudinally connected between the front neck 16 and the flat mounting section 11, a collar 13 connected between the flat mounting section 11 and the cylindrical pivot rod section 14, a plurality of annular grease grooves 17 around the periphery of the cylindrical pivot rod section 14, a flat coupling portion 15 connected between the neck 16 and the cylindrical pivot rod 14 for mounting the locating plate 4.

Figure 2:
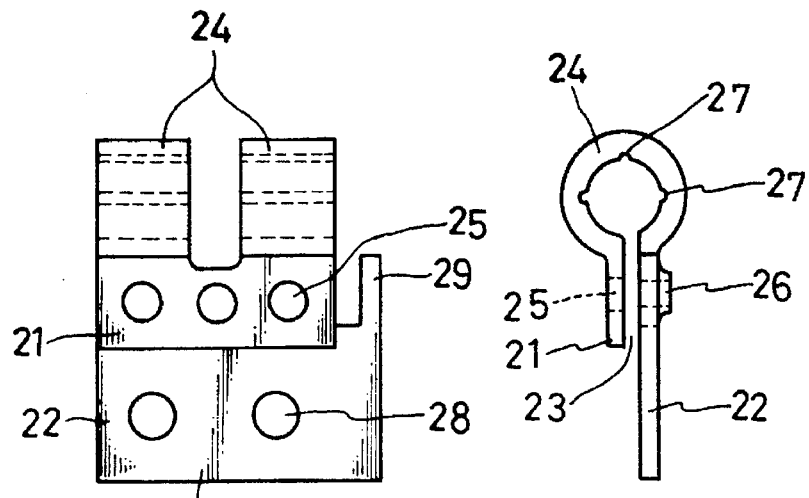
FIG. 2 are the front and right side views of the female connecting member of the pivot hinge shown in FIG. 1.

Referring to FIG. 2 and FIG. 1 again, the female connecting member 2 is made from a metal plate by stamping and bending, and includes a flat mounting base portion 22, a flat locating strip portion 21, a gap 23 defined between the flat mounting base portion 22 and the flat locating strip portion 21, two hollow cylindrical axle housing portions 24 connected between the flat locating strip portion 21 and the flat mounting base portion 22 for receiving the cylindrical pivot rod section 14 of the male connecting member 1, a plurality of longitudinal grease grooves 27 inside the axle housing portions 24, a springy projecting stop rod portion 29 extending upwardly from the flat mounting base portion 22, a row of first through holes 25 at the flat locating strip portion 21, a row of second through holes 26 at the flat mounting base portion 22 for connection to the first through holes 25 by the fastening elements 3, and a row of third through holes 28 at the flat mounting base portion 22 for fastening to the mainframe unit or top cover and display unit of the notebook computer.

Referring to FIG. 1 again, the locating plate 4 has a coupling hole 41 at the center for fitting the flat coupling portion 15 of the male connecting member 1, a first projecting portion 42 and a second projecting portion 43 extending outwardly from the periphery thereof at two opposite locations.

Figure 3:
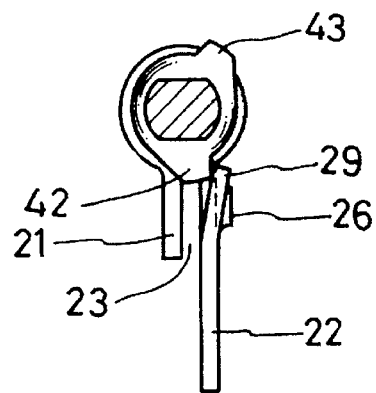
FIG. 3 is a front view of the pivot hinge shown in FIG. 1, showing the first projecting portion of the locating plate engaged against the stop rod portion.
Figure 4:
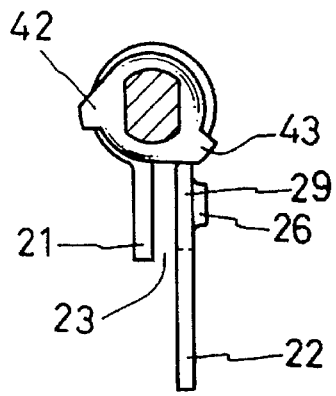
FIG. 4 is another front view of the pivot hinge shown in FIG. 1, showing the second projecting portion of the locating plate engaged at the top rod portion.
Figure 5:
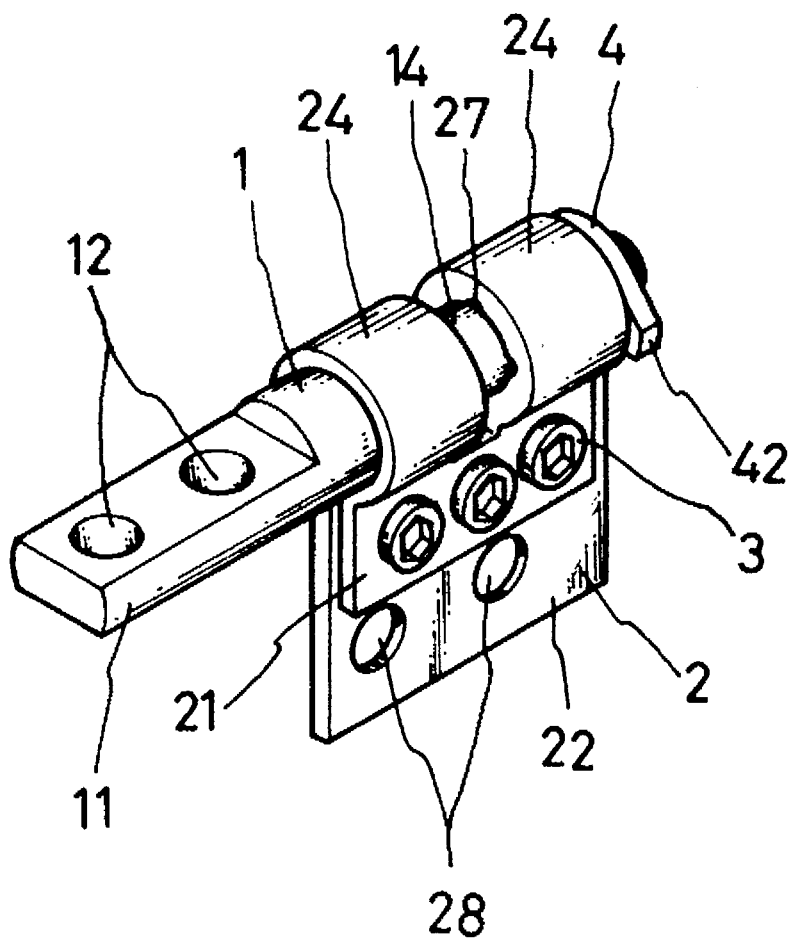
FIG. 5 is an elevational view of the pivot hinge shown in FIG. 1.

Referring to FIGS. 3, 4, and 5, and FIG. 1 again, when the cylindrical pivot rod section 14 of the male connecting member 1 is inserted through the axle housing portions 24, the first through holes 25 are respectively fastened to the second through holes 26 by the fastening elements 3 to close (or narrow) the gap 23. The locating plate 4 is then mounted around the flat coupling portion 15 of the male connecting member 1 between the axle housing portions 24 and the stop rod portion 29, and then the clamp 5 is fastened to the neck 16 of the male connecting member 1 to secure the locating plate 4 in place. According to the present preferred embodiment, the fastening elements 3 are screws.

Referring to FIG. 3 again, when the notebook computer is closed, the locating plate 4 is turned with the male connecting member 1 relative to the axle housing portions 24 of the female connecting member 2, causing the first projecting portion 42 of the locating plate 4 to engage against the stop rod portion 29 of the female connecting member 2. When the first projecting portion 42 of the locating plate 4 is engaged against the stop rod portion 29 of the female connecting member 2, the stop rod portion 29 is slightly flexed. When the lock of the notebook computer is unlocked, the stop rod portion 29 produces a spring reaction to force the first projecting portion 42 of the locating plate 4 outwards, thereby causing the locating plate 4 and the male connecting member 1 to turn through a small angle relative to the axle housing portions 24, and therefore the top cover and display unit of the notebook computer can be easily opened from the mainframe unit.

Referring to FIGS. 4 and 5 again, when the top cover and display unit is fully opened, the second projecting portion 43 is stopped at the stop rod portion 29, and therefore the notebook computer is retained in the open status. Furthermore, by turning the fastening elements 3 inwards or outwards, the friction resistance between the cylindrical pivot rod section 14 of the male connecting member 1 and the axle housing portions 24 of the female connecting member 2 is relatively adjusted. By means of the friction resistance between the cylindrical pivot rod section 14 of the male connecting member 1 and the axle housing portions 24 of the female connecting member 2, the top cover and display unit of the notebook computer can be positioned at any angle within the fully open position.

While only one embodiment of the present invention has been shown and described, it will be understood that various modifications and changes could be made without departing from the spirit and scope of the disclosed invention. For example, the male connecting member 2 may be provided with only one axle housing portion instead of the aforesaid two axle housing portions; and the neck 16 of the male connecting member 2 may be threaded so that a nut can be threaded onto the neck 16 to hold the locating plate 4 in place.

What the invention claimed is:

1. A pivot hinge adapted to be connected between two parts of a portable computer for permitting the two parts of the portable computer to be turned relative to each other, the pivot hinge comprising:

a female connecting member adapted to be fastened to the first part of the portable computer, said female connecting member comprising a flat mounting base portion, a flat locating strip portion spaced from said flat mounting base portion in a parallel relation by a gap, at least one hollow cylindrical axle housing portion connected between said flat locating strip portion and said flat mounting base portion, a row of first through holes at said flat locating strip portion, a row of second through holes at said flat mounting base portion, a row of third through holes at said flat mounting base portion adapted to be fastened to the first part of the portable computer by fastening elements, and a plurality of fastening elements adapted to be connected between said first through holes and said second through holes for holding said flat locating strip portion and said flat mounting base portion closely together and adjusting the gap between said flat locating strip portion and said flat mounting base portion;

a male connecting member fastened to a second part of the portable computer, said male connecting member comprising a flat mounting section at one end, a plurality of axle holes at said flat mounting section adapted to be fastened to the second part of the portable computer, a neck at an opposite end, a cylindrical pivot rod section longitudinally connected between said neck and said flat mounting section and inserted through the at least one axle housing portion of said female connecting member, a collar connected between said flat mounting section and said cylindrical pivot rod section and disposed outside the at least one axle housing portion of said female connecting member; and an end member fastened to the neck of said male connecting member to hold said male connecting member and said female connecting member together.

2. The pivot hinge of claim 1 wherein said female connecting member comprises a plurality of longitudinally spaced, axle housing portions connected between said flat locating strip portion and said flat mounting base portion.

3. The pivot hinge of claim 1 wherein the cylindrical pivot rod section of said male connecting member has a plurality of annular grease grooves around the periphery thereof.

4. The pivot hinge of claim 1 wherein the at least one axle housing portion of said female connecting member includes a plurality of longitudinal grease grooves on the inside thereof.

5. The pivot hinge of claim 1 wherein said fastening elements are screws.

6. The pivot hinge of claim 1 wherein said end member is a clamp.

7. The pivot hinge of claim 1 wherein said end member is a nut threaded onto an outer thread around the periphery of the neck of said male connecting member.

8. The pivot hinge of claim 1 further comprising a springing and positioning mechanism including a flat coupling portion on said male connecting member between said neck and said cylindrical pivot rod section thereof, a springy stop rod portion extending from the flat mounting base portion of said female connecting member, and a locating plate coupled to said flat coupling portion of and turned with said male connecting member relative to the at least one axle housing portion of said female connecting member, said locating plate having a first projecting portion for engaging against said springy stop rod portion to flex same when the two parts of the portable computer are closed, and a second projecting portion for engaging against said stop rod portion when the two parts of the portable computer are opened.

* * * * *